3,048,518
N-(4-SULFONAMIDOPHENYL)-BUTANE SULTAME
Burckhardt Helferich, Bonn, Robert Behnisch, Wuppertal-Vohwinkel, and Wolfgang Wirth, Wuppertal-Elberfeld, Germany, assignors to Farbenfabriken Bayer Aktiengesellschaft, Leverkusen, Germany, a corporation of Germany
No Drawing. Filed Mar. 24, 1960, Ser. No. 17,254
Claims priority, application Germany Mar. 28, 1959
4 Claims. (Cl. 167—51.5)

The instant invention relates to N-(4-sulfonamidophenyl)-butane sultame having the formula

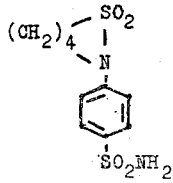

The sultame in accordance with the invention constitutes valuable therapeutic agents showing a high anticonvulsive activity in mammals.

Sultames in which the N-atom is substituted by alkyl and aralkyl radicals have been described in German Patent 935,129, additionally sultames in which the N-atom substituted by an aryl radical have been described in U.S. application Serial No. 605,492.

The N-alkyl substituted alkane sultames display no particularly valuable pharmacological properties. The N-aryl substituted alkane sultames possess some anticonvulsive activity but their use is disadvantageously complicated in that the same possess hypnotic and anesthetic properties and that they also act to lower the body temperature. The said side effects seriously mitigate against the use of the N-aryl substituted alkane sultames as for example anti-epileptics where chronic administration of the treatment agent is required.

The N-(4-sulfonamidophenyl)-butane sultame in accordance with the invention exhibits marked anticonvulsive porperties but shows no significant hypnotic and/or analgesic effect nor does it produce any significant effect upon the body temperature.

The N-(4-sulfonamidophenyl)-butane sultame of the invention may be obtained according to various methods.

For instance 4-aminophenylsulfonamide can be reacted with a compound of the general formula

wherein X signifies a halogen atom, or a hydroxyl, acyloxy, alkyloxy, aryloxy or aralkyloxy group, and from the intermediate product of this reaction a compound of the general formula HX is split off.

Alternately a 4-aminophenylsulfonamide can be reacted with a compound of the general formula

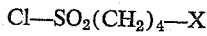

wherein X has the meaning set out above and without previous separation of the intermediate product a compound of the general formula HX is split off.

By still another method a 4-aminophenylsulfonamide can be condensed with a 4-halogenbutanesulfonic acid or with a salt or ester of such an acid and the condensation product treated with a cyclization agent, as for example, phosphoroxychloride.

It is also possible for 4-aminophenylsulfonamides to be condensed with a compound of the general formula Hal—(CH$_2$)$_4$—Y, wherein Y represents a group that can be converted into a sulfonic acid or a sulfonic acid halogenide group, and where the condensation product Y is converted into a sulfonic acid or sulfonic acid halogenide and the product thereby attained is treated with a cyclization agent such as phosphoroxychloride.

Finally the amino group in the N-(4-aminophenyl)-butane sultame can be converted by conventional means into the sulfonamide group, or N-phenylbutane sultame can be sulfochlorinated in the p-position of the phenyl radical and the resultant sulfochloride treated with ammonia.

N-(4-sulfonamidophenyl)-butane sultame has a marked effect in the electroconvulsion test on rats, causing the disappearance of the tonic convulsion components.

In the metrazol convulsion test on rats the preparation likewise suppresses the tonic cramp components and reduces as well the mortality of otherwise a lethal metrazol intoxication. However, a complete abolition of metrazol convulsions is not achieved, contrary to the action of the barbiturates, which are known to act antagonistically towards metrazol. The preparation corresponds approximately in its anti-cramp effect in animal experiments qualitatively and quantitatively with diphenylhydantoin. Consideration of the DL-50 (toxicity) and the DE-50 (anti-cramp effect at maximal dosage in the rats) gives a therapeutic index of 20.

The N-(4-sulfonamidophenyl)-butane sultame preparation shows no significant hypnotic and/or analgesic effects, nor any significant effect upon body temperature.

The acute toxicity for rats and rabbits of this preparation is slight; cats and dogs appear more sensitive.

The ability of cats and rabbits to endure subchronic addition of doses which were not effective in acute tests was tested. They satisfied the requirements.

The preparation was clinically used in treatment of epilepsy in humans. The preparation acted particularly well upon psychomotor (temporal) epilepsy in which the convulsions are overshadowed by psychial disturbances and their equivalents. According to earlier clinical observations it was shown that the product of this process was essentially more effective than the usual anti-epileptics for this extremely widespread form of epilepsy. The usual anti-epileptics are either hardly effective upon the depression state and its equivalents in psychomotor epilepsy or they act to strengthen them. On the other hand, the administration of N-(4-sulfonamidophenyl)-butane sultame in the majority of cases remedies or alleviates the psychic disturbances in a striking manner.

The N-(4-sulfonamidophenyl)-butane sultame is produced employing 4-aminobenzene sulfonamide and as the other reactant a material containing the (CH$_2$)$_4$ moiety.

The N-(4-sulfonamidophenyl)-butane sultame is a colorless solid having only a relatively slight solubility in water.

The following examples are given by way of illustration and not limitation.

Example 1

At a temperature not exceeding 20° C., 60 g. 4-chlorbutane-sulfochloride are slowly added dropwise to a solution of 51 g. 4-aminobenzenesulfonamide in 100 ml. pyridine. The solution takes on a dark red color. The solution is stirred for 12 hours at room temperature, heated for 30 minutes to 40° C. and then stirred into a mixture of 1 liter water and 300 ml. hydrochloric acid. The hardening precipitate, which is first resinous but soon crystalline, is drawn off, washed free of acid with water and heated with stirring in a solution of 150 g. sodium carbonate in 1 liter of water. The intermediate product passes temporarily into solution and a new compound of bright yellow crystals is precipitated out, which on cooling is drawn off and washed with water. Purification of the raw product is achieved by dissolving it in 1 liter water to which 20 g. sodium carbonate have been added. The solution is decolorized while hot with charcoal, filtered and acidified with hydrochloric acid. The N-(4-sulfonamidophenyl)-butane sultame forms as colorless crystals, M.P. 182° C., yield 57 g.

Example 2

900 g. 4-aminobenzenesulfonamide are caused to react with 950 g. 4-chlorbutanesulfochloride in 2 liters of pyridine as described in Example 1. The raw product, a bright yellow substance precipitated out of the boiling sodium carbonate solution is dissolved in 5 liters water, to which 250 g. sodium hydroxide have been added. The solution is then decolorized with charcoal, filtered and hot filtrate combined with 2 liters 40% caustic soda. On cooling the sodium salt of the N-(sulfonamidophenyl)-butane sultame crystallizes as colorless crystals. The crystals are drawn off and washed with dilute caustic soda and alcohol. The sodium salt is a powder that dissolves easily in water and has an alkaline reaction. From this watery solution, together with acetic acid, the compound described in Example 1, M.P. 182° C., precipitates.

Example 3

22.6 g. N-(4-aminophenyl)-butane sultame is introduced into 150 ml. acetic acid and combined with 50 ml. conc. hydrochloric acid. Under stirring at a temperature of from 0°–5° C. the mixture is diazotized through dropwise addition of a solution of 7 g. sodium nitrite in 15 ml. water. The resulting solution is poured with stirring into 150 ml. glacial acetic acid, which has been saturated with sulfur dioxide and to which 2 g. of cupric-(I)-chloride has been added. N-phenylbutane sultame-4-sulfochloride precipitates out in colorless crystals that are drawn off and, without further purification stirred into a 50 ml. ice cooled water ammonia solution. The solution is stirred for two hours at room temperature, heated briefly to boiling and acidified with acetic acid, whereupon the N-(4-sulfonamidophenyl)-butane sultame precipitates out in colorless crystals that, after recrystallization from a 10% acetic acid solution, have an M.P. of 181–182° C. and are identical with the products obtained in Examples 1 and 2.

The N-(4-aminophenyl)-butane sultame required as the initial product is produced by condensation of 4-chlorbutanesulfochloride with p-aminoacetanilide and deacetylation of the resulting N-(4-acetylaminophenyl)-butane sultame, M.P. 178° C. by heating together with a 20% sulfuric acid solution. It melts at 143° C.

We claim:

1. N-(4-sulfonamidophenyl)-butane sultame.

2. A method of treating disease characterized by convulsive seizures which comprises administering to the subject suffering from such disease a therapeutic amount of N-(4-sulfonamidophenyl)-butane sultame.

3. A method for treating epilepsy which comprises adminstering to the subject suffering from such disease a therapeutic amount of N-(4-sulfonamidophenyl)-butane sultame.

4. Process for preparing N-(4-sulfonamidophenyl)-butane sultame which comprises reacting N-(4-aminophenyl)-butane sultame with sodium nitrite in hydrochloric acid solution, adding sulfur dioxide and cupric chloride to the reaction mixture to thereby obtain N-phenyl-butane sultame-4-sulfochloride and reacting the N-phenyl-butane sultame-4-sulfochloride with ammonia to produce N-(4-sulfonamidophenyl)-butane sultame.

References Cited in the file of this patent

UNITED STATES PATENTS 2,916,489　Helferich _____ Dec. 8, 1959